United States Patent
Bernardi et al.

(10) Patent No.: US 9,891,931 B2
(45) Date of Patent: Feb. 13, 2018

(54) TECHNIQUES FOR EFFICIENT REMOTE PRESENTATION SESSION CONNECTIVITY AND ROUTING

(75) Inventors: Ara Bernardi, Mercer Island, WA (US); Mahadev K. Alladi, Sammamish, WA (US); Ido Ben-Shachar, Kirkland, WA (US); Wilhelm R. Schmieder, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 12/816,254

(22) Filed: Jun. 15, 2010

(65) Prior Publication Data

US 2011/0307614 A1 Dec. 15, 2011

(51) Int. Cl.
G06F 15/16 (2006.01)
G06F 9/44 (2018.01)
G06F 9/455 (2018.01)

(52) U.S. Cl.
CPC ........ G06F 9/4445 (2013.01); G06F 9/45533 (2013.01)

(58) Field of Classification Search
CPC ............................ G06F 9/45533; G06F 9/4445
USPC ........................................................ 709/227
See application file for complete search history.

(56) References Cited

U.S. PATENT DOCUMENTS

| 6,519,249 B1* | 2/2003 | Bennefeld et al. | 370/352 |
| 6,901,429 B2 | 5/2005 | Dowling | |
| 7,103,651 B2* | 9/2006 | Bohannon et al. | 709/223 |
| 7,673,056 B1 | 3/2010 | Inbaraj et al. | |
| 2001/0029545 A1* | 10/2001 | Takahashi | H04L 12/2602 709/234 |
| 2002/0112036 A1* | 8/2002 | Bohannon et al. | 709/220 |
| 2005/0268304 A1* | 12/2005 | Halstead | 719/310 |
| 2007/0121584 A1* | 5/2007 | Qiu et al. | 370/352 |
| 2007/0174429 A1* | 7/2007 | Mazzaferri et al. | 709/218 |

(Continued)

FOREIGN PATENT DOCUMENTS

| CN | 101410803 A | 4/2009 |
| CN | 101656708 A | 2/2010 |
| CN | 101667144 A | 3/2010 |

OTHER PUBLICATIONS

Baratto et al., "MobiDesk: Mobile Virtual Desktop Computing", 10th Annual International Conference on Mobile Computing and Networking, Philadelphia, PA, USA, Sep. 26-Oct. 1, 2004, 1-15.

(Continued)

*Primary Examiner* — Hua Fan
(74) *Attorney, Agent, or Firm* — Baker & Hostetler LLP (57) ABSTRACT

Techniques are disclosed for efficient remote presentation session connectivity and routing. In an embodiment, the roles of a remote presentation session deployment involved in receiving a connection from a client and determining a virtual machine (VM) to serve the client's remote presentation session are consolidated on one or more servers of the deployment that host such VMs. When this consolidated role receives a connection set up communication from a client, it uses information local to it and its server to determine a VM to serve the remote presentation session. Where the deployment comprises a plurality of such servers, the consolidated role may communicate with an inter-server connection broker to determine a different server that will conduct the remote presentation session.

20 Claims, 9 Drawing Sheets

(56) References Cited

U.S. PATENT DOCUMENTS

| | | | |
|---|---|---|---|
| 2007/0186212 A1 | 8/2007 | Mazzaferri et al. | |
| 2007/0260702 A1* | 11/2007 | Richardson | G06F 17/30861 709/217 |
| 2008/0049786 A1 | 2/2008 | Ram et al. | |
| 2009/0006537 A1 | 1/2009 | Palekar et al. | |
| 2009/0150550 A1 | 6/2009 | Barreto et al. | |
| 2009/0241176 A1 | 9/2009 | Beletski et al. | |
| 2009/0248869 A1 | 10/2009 | Ghostine | |
| 2009/0260007 A1 | 10/2009 | Beaty et al. | |
| 2010/0042636 A1* | 2/2010 | Lu | 707/100 |
| 2010/0269174 A1* | 10/2010 | Shelest | 726/22 |
| 2011/0019676 A1* | 1/2011 | Portolani et al. | 370/395.53 |
| 2011/0154443 A1* | 6/2011 | Thakur et al. | 726/3 |
| 2011/0277026 A1* | 11/2011 | Agarwal et al. | 726/8 |
| 2011/0277027 A1* | 11/2011 | Hayton et al. | 726/8 |
| 2012/0059921 A1* | 3/2012 | Serban et al. | 709/223 |

OTHER PUBLICATIONS

"Quest Software", www.vworkspace.com-solutions-vas-vas_scalability.aspx, accessed Apr. 14, 2010, 1 page.

"Office Action Issued in Chinese Patent Application No. 201110170717.7", dated Jan. 6, 2017, 8 Pages.

* cited by examiner

TECHNIQUES FOR EFFICIENT REMOTE PRESENTATION SESSION CONNECTIVITY AND ROUTING

BACKGROUND

Although computers were once isolated and had minimal or little interaction with other computers, computers now interact with a wide variety of other computers through Local Area Networks (LANs), Wide Area Networks (WANs), dial-up connections, and the like. With the widespread growth of the INTERNET® computer network, connectivity between computers has become more important and has opened up many new applications and technologies. The growth of large-scale networks, and the widespread availability of low-cost personal computers, has fundamentally changed the way that many people work, interact, communicate, and play.

One increasing popular form of networking may generally be referred to as remote presentation, which can use protocols such as Remote Desktop Protocol (RDP), Independent Computing Architecture (ICA), and others to share a desktop and other applications with a remote client. Such computing systems typically transmit the keyboard presses and mouse clicks or selections from the client to a server, relaying the screen updates back in the other direction over a network connection (e.g., the INTERNET®). As such, the user has the experience as if their machine is executing the applications locally, when in reality the client device is only sent screenshots of the applications as they appear on the server side.

In an environment where many remote presentation sessions are to be served concurrently, such as for a large corporation, these remote presentation sessions may be served by a plurality of virtual machines (VMs) on one physical server, or by a grouped plurality of servers, commonly referred to as a server farm or a deployment. The servers of the deployment may perform different roles or role services (a role is configured to perform a specific function for multiple users or other computers within a network). For instance, one server may function as a connection broker that assigns incoming remote presentation session requests to other servers that serve remote presentation sessions.

A remote presentation session deployment (such as a Virtualization Desktop Infrastructure, or VDI deployment) may require a plurality of these roles for the deployment to function. In a VDI context, these may be, for instance, (1) a Remote Desktop Service Host (RDSH) role configured as a Virtual Machine Redirector, that accepts incoming remote presentation session connections from clients; (2) a Remote Desktop Connection Broker (RDCB) that determines among a plurality of remote presentation servers (and possibly a plurality of VMs within a server) a server to conduct the remote presentation session with the client; and (3) a Remote Desktop Virtualization Host (RDVH) that functions as a remote presentation server to the client. An incoming connection from a client to set up a remote presentation session is received at the RDSH role, and then routed to the RDBC. At the RDCB, the set up process is broken into several phases—arbitration, load balancing, and placement. RDCB then re-routes the call to the RDVH in order to complete the final phase of orchestration by bringing the VM online and making sure that the VM is ready to accept a remote presentation session connection.

The complexity of such a deployment is due to the spread of the functionality across multiple roles, which makes it very difficult to deploy this infrastructure. Adding to this complexity is the difficulty in diagnosing a given connection that takes multiple hops across several machine boundaries (virtual machine boundaries or physical machine boundaries) makes it hard to monitor and diagnose connection failures.

SUMMARY

It would therefore be an improvement to modify a remote presentation session deployment to combine the roles of such a deployment within one machine (the one machine performing the function of a "consolidated role"). The consolidation and simplification of this connection and routing model for a deployment may be based on aggregation of information available on the server that executes the consolidated role due to the server also hosting VMs that serve remote presentation sessions.

This consolidation of the connection and routing model not only simplifies the system (such as by eliminating the need for a connection broker), but also enables the system to perform functions that it could not perform previously. For instance, the consolidated system may function through a single connection from the client to the system, where the consolidated role acts as a proxy or a router between the client and the VM that hosts the remote presentation session with the client.

In an embodiment, a server comprises a consolidated role. A client connects to the consolidated role to set up a remote presentation session. The consolidated role determines a VM among a plurality of VMs on the server that can serve remote presentation sessions. The consolidated role determines this based on aggregation of information available on the server that executes the consolidated role. This information may be aggregated due to the server also hosting VMs that serve remote presentation sessions. The consolidated role sends the client an indication of the VM that will serve the client's remote presentation session, and the client contacts that VM to establish the remote presentation session.

In another embodiment, the consolidated role functions as a router, or proxy, for communications in a remote presentation session between the client and the VM. After receiving a connection set up message from the client, and determining a VM to serve the client's remote presentation session, the consolidated role constructs a full remote presentation session connection between the consolidated role and that VM, and acts as a router or proxy for remote presentation session communications between the client and the VM. In doing this, the client does not need to separately establish a remote presentation session connection with the VM.

In an embodiment, the consolidated role routes communication between the client and the VM through the use of shared resources. A remote presentation session protocol stack is divided between the consolidated role and the VM. The consolidated role then communicates with the VM by either sending information "up" the divided remote session protocol stack to the VM or receiving information sent "down" the divided remote session protocol stack from the VM.

In an embodiment, a deployment comprises a plurality of servers that comprise consolidated roles. A client connects to one of the consolidated roles to set up a remote presentation session. This consolidated role may either locate a VM on its server to serve the remote presentation session, or if none are available, communicate with a broker to find a VM on another server. The broker is in communication with the plurality of servers and will send the consolidated role the identity of a second server that will serve the remote presentation session to the client. The consolidated role receives this information and sends it to the client. The client then contacts this second server to conduct the remote presentation session.

As described herein, a machine may be a physical machine or a virtual machine, unless otherwise made clear in discussing a particular machine.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for efficient remote presentation session connectivity and routing are further described with reference to the accompanying drawings in which.

DETAILED DESCRIPTION OF ILLUSTRATIVE EMBODIMENTS

Figure 1:
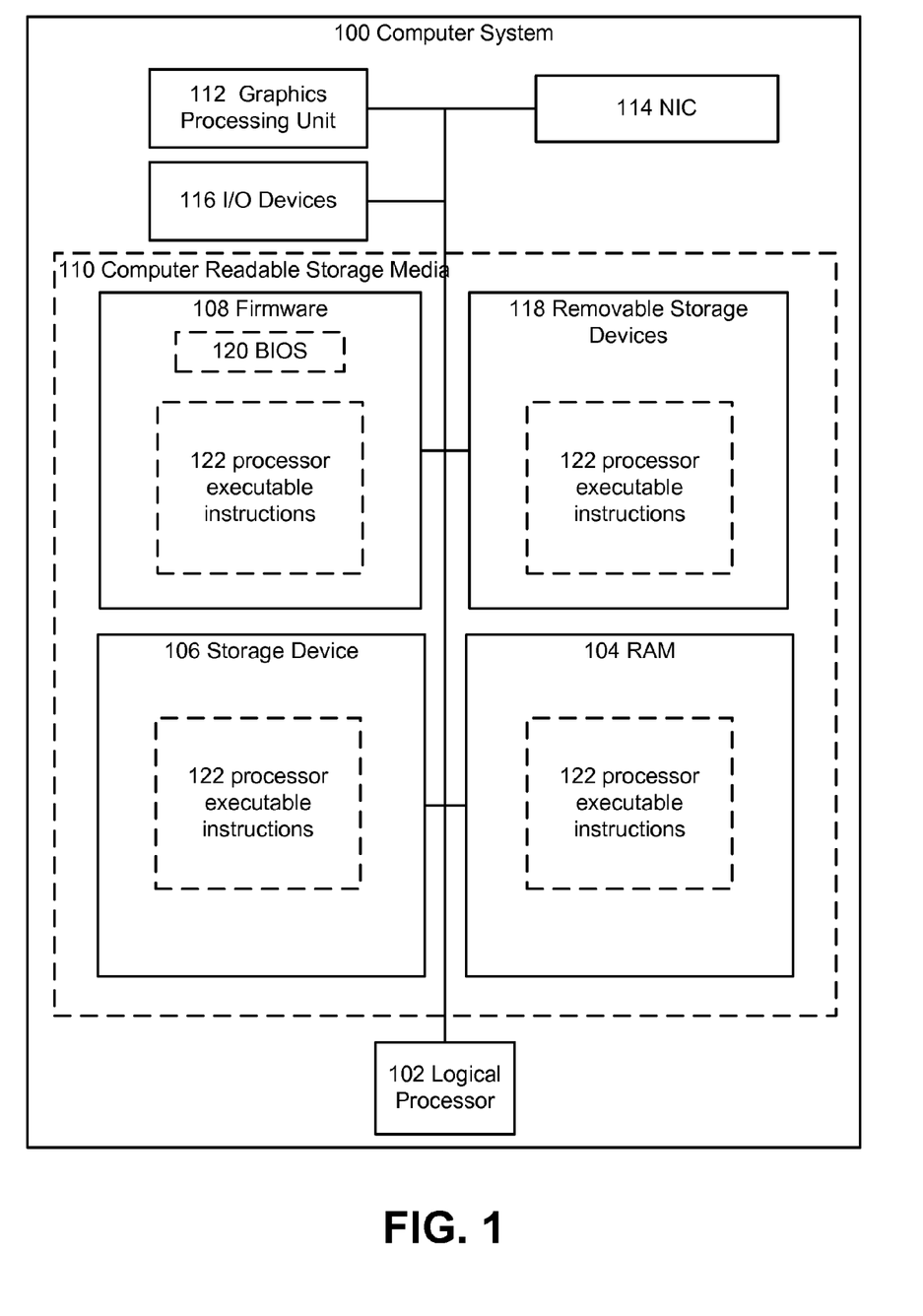
FIG. 1 illustrates an exemplary general purpose computing environment in which in which the techniques described herein may be embodied.

FIG. 1 is a block diagram of a general purpose computing device in which the techniques described herein may be employed. FIG. 1 and the following discussion are intended to provide a brief general description of a suitable computing environment in which the disclosure may be implemented.

The term circuitry used throughout the disclosure can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM (herein referred to as "system memory"), ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media 110 can provide non volatile and volatile storage of processor executable instructions 122, data structures, program modules and other data for the computer 100 such executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processing unit (GPU) 112 having access to video memory. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card (NIC) 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
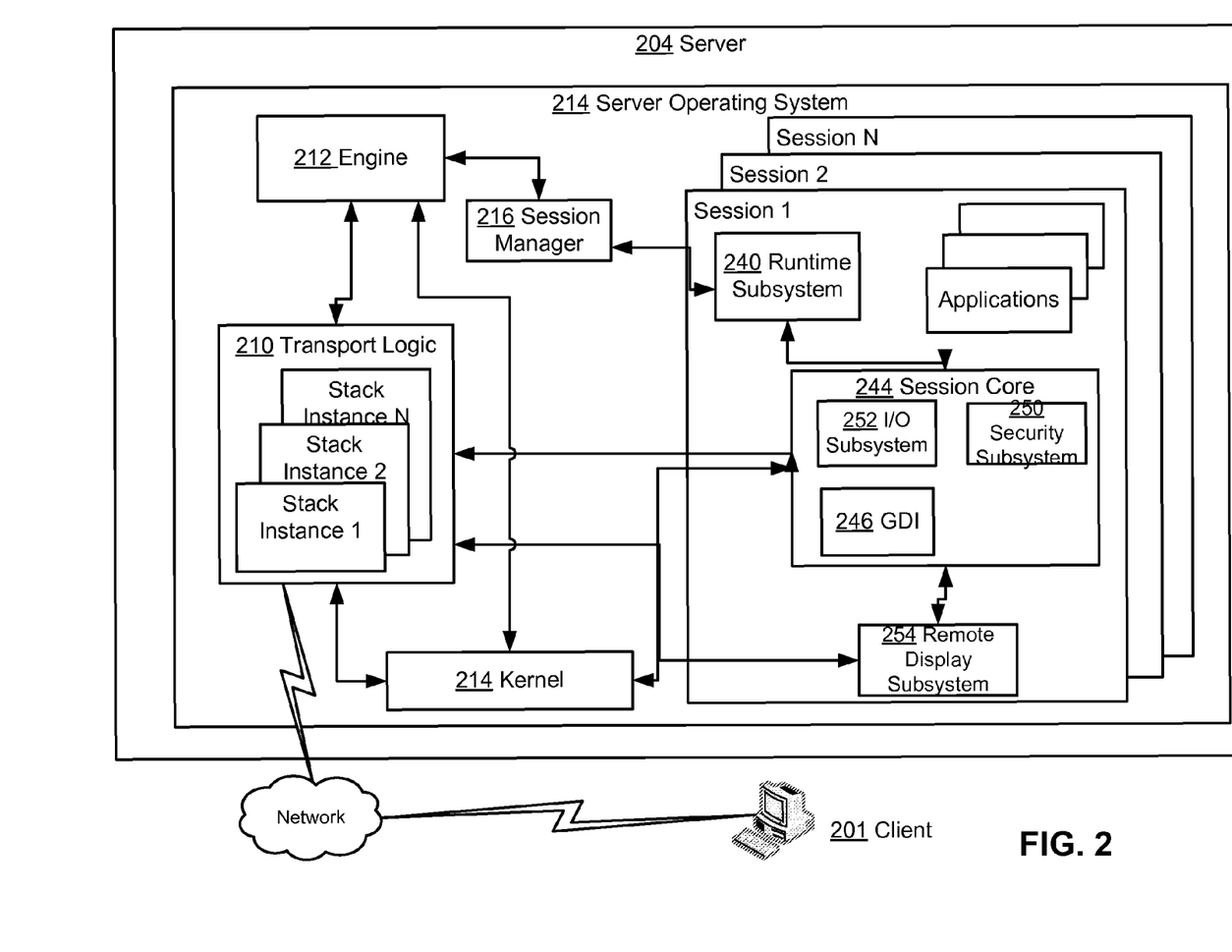
FIG. 2 depicts an example remote presentation session server wherein aspects of the present disclosure can be implemented.

Referring now to FIG. 2, it generally illustrates an example environment wherein aspects of the present disclosure can be implemented. One skilled in the art can appreciate that the example elements depicted by FIG. 2 are illustrated to provide an operational framework for describing the present disclosure. Accordingly, in some embodiments the physical layout of each environment may be different depending on different implementation schemes. Thus the example operational framework is to be treated as illustrative only and in no way limit the scope of the claims. One skilled in the art can also appreciate that the following discussion is introductory.

Generally, FIG. 2 depicts a high level overview of a server environment that can be configured to include aspects of the present disclosure. In reference to the figure, depicted is a server 204 that can include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present disclosure can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present disclosure can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present disclosure, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
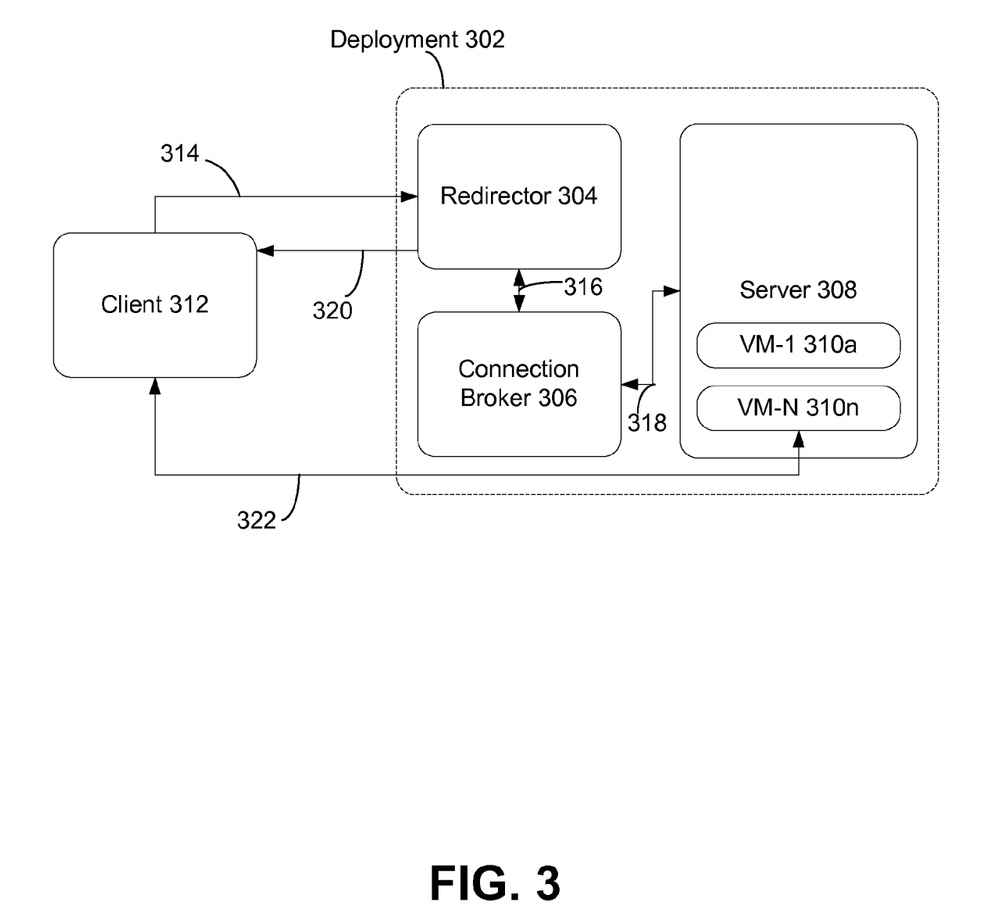
FIG. 3 depicts an example remote presentation session connection set up between a client and a deployment that comprises a plurality of roles, each role functioning on a separate machine.

FIG. 3 depicts an example remote presentation session connection set up between a client and a deployment that comprises a plurality of roles, each role functioning on a separate machine. Each machine discussed herein may comprise, for example, computing device 141 of FIG. 1, or a VM executing on computing device 141 of FIG. 1.

Deployment 302 comprises redirector 304, connection broker 306, and server 308. Redirector receives requests from a client, such as client 312, and handles operations like authenticating the client and issuing the client a license to conduct a remote presentation session with deployment 302. Connection broker 306 determines a server or a VM on a server to serve a remote presentation session with a client. Such a VM may comprise, for example, a virtualized server 204 of FIG. 2. Server 308 serves remote presentation sessions through hosting one or more VMs (herein depicted as VM-1 310a through VM-N 310n).

Deployment 302 may comprise other roles that have not been depicted (so as to make what is depicted clear). Those roles may include roles such as a remote presentation web access role (that publishes virtual desktop to clients using a web interface to conduct a remote presentation session), and a domain services role (that stores assignments of users of clients to personal virtual desktops).

Client 312 communicates 314 with deployment 302 to establish a remote presentation session. For instance, client 312 may comprise a TsClient (Terminal Server Client) and deployment 302 may comprise a VDI deployment. This communication 314 is received by deployment 302 at redirector 304. In a VDI deployment, redirector 304 may comprise a RDSH role serving the function of redirecting clients. Redirector 304 authorizes the client or a user of the client based on one or more credentials, and queries 316 connection broker 306 to determine a VM to redirect client 312 to with which client 312 may conduct a remote presentation session. Connection broker 306 communicates 318 with one or more servers (depicted here is server 308) to determine information about the VMs 310a, 310n hosted on the server, such as whether a VM is able to accept new connections (as opposed to being in a drain-connections-then-sleep state, for instance).

Based on the information received from one or more servers, connection broker 306 selects a VM with which client 312 will conduct the remote presentation session. Connection broker 306 communicates 316 this selected VM to redirector 304. Redirector 304 communicates 320 this selected VM to client 312 as well as issues client 312 a license with which to conduct the remote presentation session (note that the license may be sent to the client at a variety of times, and this illustrates just one such embodiment). Client 312 then communicates 322 with the selected VM (herein shown as VM-N 310n) to establish and then conduct the remote presentation session.

Figure 4:
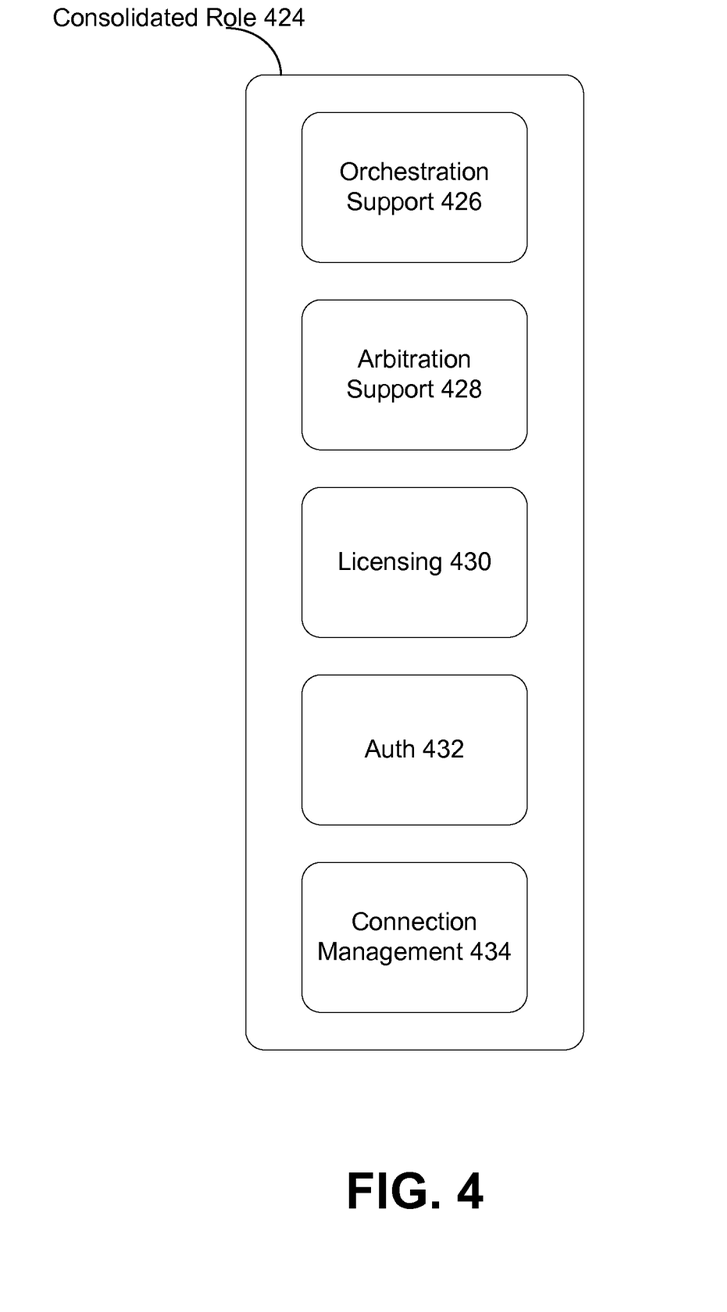
FIG. 4 depicts a plurality of roles consolidated on one machine according to the present techniques.

FIG. 4 depicts a plurality of roles consolidated on one machine according to the present techniques. This consolidated role 424 may provide to a deployment each of orchestration support 426, arbitration support 428, licensing 430, authorization 432 and connection management 434. These elements are displayed as such for logical clarity, and it may be appreciated that they may be grouped together or subdivided in other ways that also effect the techniques of a consolidated role.

Orchestration support 426 is configured to coordinate the exchange of information between other parts of consolidated role 424, and to make a VM on a server that executes consolidated role 424 available for use in a remote presentation session (by bringing the VM online if it is either in an off or saved state, and ensuring that the VM is ready to accept remote presentation session connections). Arbitration support 428 is configured to determine a VM among a plurality of VMs hosted on the machine with which the client will conduct the remote presentation session. Licensing 430 is configured to issue a license to a client that licenses the client to conduct a remote presentation session with the deployment of which consolidated role 424 is a part (or validate a license that the client already possesses).

Authorization 432 is configured to determine that a client is authorized to conduct a remote presentation session with the deployment of which consolidated role 424 is a part. This may, for instance, comprise checking that a client's credentials (such as login and password) are valid for the deployment. Connection management 434 is configured to communicate with the client, and also communicate with one or more VMs on the machines, such as when serving the role of "router" or "proxy" in a remote presentation session, as described with respect to FIG. 6, below.

This consolidated role may comprise a single computer process. By effecting all of the above role functions through a single process, this eliminates the need for network communications, and authentication requirements between components.

Figure 5:
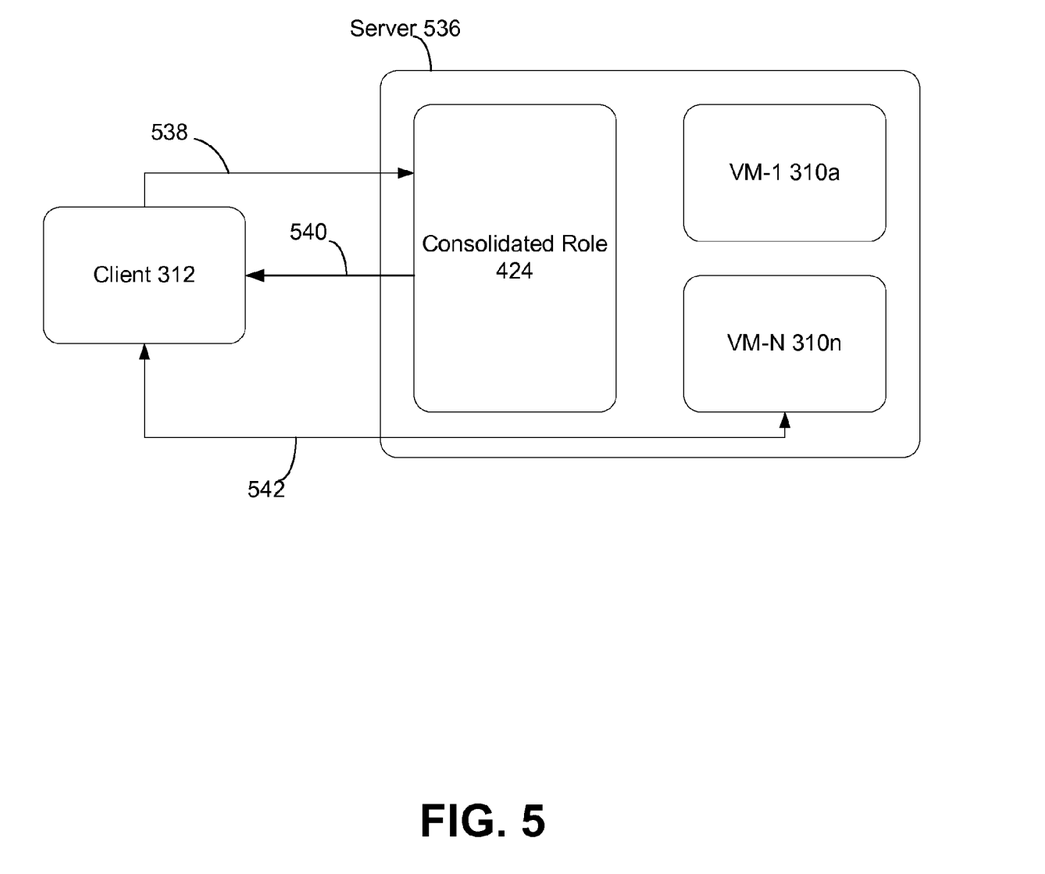
FIG. 5 depicts an example remote presentation session connection set up between a client and a server that comprises a consolidated role.

FIG. 5 depicts an example remote presentation session connection set up between a client and a server that comprises a consolidated role. In an embodiment, the consolidated role comprises a single process executing within a partition of the server. This single process implementation reduces complexity because no authentication is required as between individual components or processes of the consolidated role, as well as reduces the amount of network or inter-process communication required to effect a remote presentation session.

Client 312 sends a remote presentation session connection set up message 538 to consolidated role 424 of server 536. Consolidated role 424 authorizes the client with authorization 432

Connection management 434 selects a VM of a plurality of VMs (herein depicted as VM-1 310a and VM-N 310n) will conduct the remote presentation session with client 312. This may be effectuated, for example, by connection management 434 maintaining a database (or other data store) of information corresponding to the VMs hosted on server 536. Connection management 434 may also get this information by querying one or more of the VMs for information regarding their ability or appropriateness to serve a remote presentation session with client 312 (such as a VM that is serving a remote presentation session with client 312, the remote presentation session being in a disconnected state that can be re-connected). This querying of the VM or VMs may be done, for example, upon determining that client 312 is to be assigned to a VM.

After selecting the VM (herein depicted as VM-N 310n), consolidated role 424 communicates 540 the selected VM to client 312. Client 312 then communicates 542 with the selected VM (VM-N 310n) to establish and then conduct the remote presentation session.

Where consolidated role 424 executes within a partition of server 536, in an embodiment, consolidated role 424 executes within a host operating system or within a guest operating system of a VM of server 536.

Figure 6:
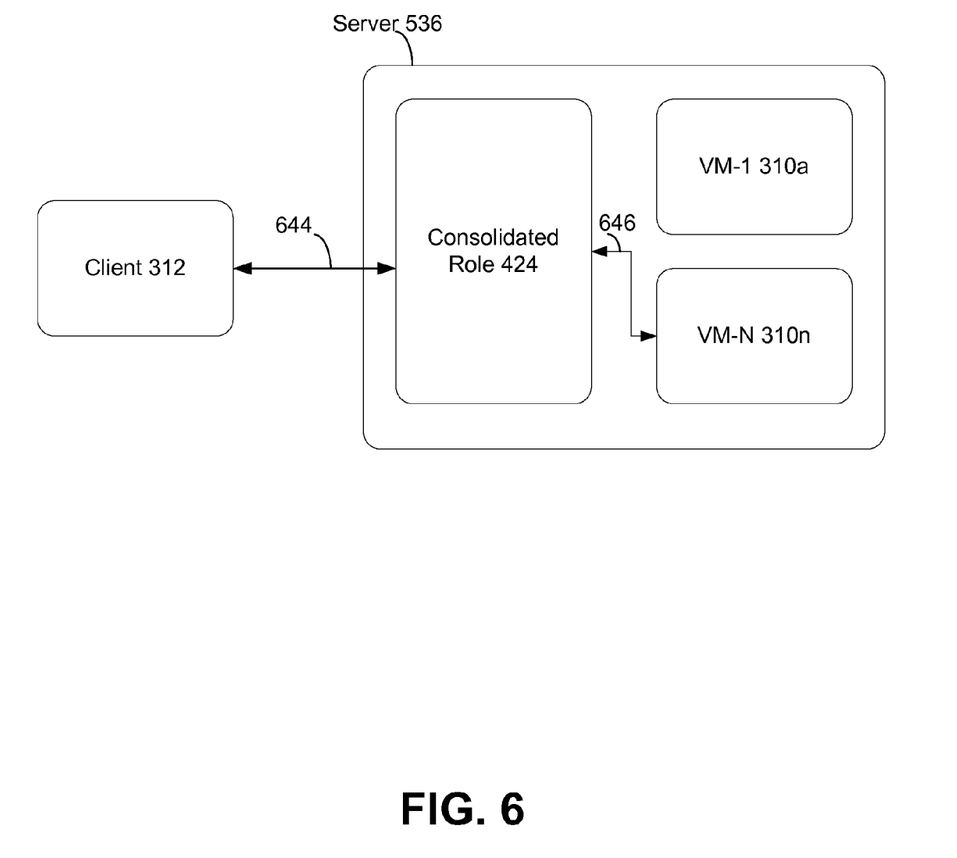
FIG. 6 depicts an alternate example remote presentation session connection set up between a client and a server that comprises a consolidated role.

FIG. 6 depicts an alternate example remote presentation session connection set up between a client and a server that comprises a consolidated role. Whereas, as depicted in FIG. 5, client 312 makes a separate communication to VM-N 310 to establish and conduct a remote presentation session, as depicted in FIG. 6, consolidated role 424 serves a router or proxy function between client 312 and VM-N 310a for both establishing and conducting a remote presentation session. This may be accomplished through hosting, on one server, both a consolidated role and a plurality of VMs that are configured to serve remote presentation sessions.

Client 312 communicates 644 with consolidated role 424, which performs functions similar to as described in FIG. 5—consolidated role 424 performs client authorization and licensing, and looks up in a database of known VMs on server 536 to determine if any VM qualifies as a proper target for client 312's remote presentation session.

Rather than sending client 312 an indication of the selected VM with which to communicate, as depicted in FIG. 5, here connection management 434 of consolidated role 424 serves a router or proxy function for the remote presentation session between client 312 and the selected VM (herein depicted as VM-N 310a). Consolidated role 424 constructs a full remote presentation session connection 646 between consolidated role 424 and VM-N 310n, and communicates 644 to client 312 that a remote presentation session has been established. In this way, client 312 does not "know" that it is conducting a remote presentation session with the selected VM, and client 312 does not need to make a separate communication to the selected VM to establish the remote presentation session. Rather, client 312 conducts a remote presentation session with VM-N 310n by communicating 644 with consolidated role 424, which serves a router or proxy function, and communicates 646 what is received from client 312 to VM-N 310n, and vice versa. These communications sent from client 312 to consolidated role 424 may be referred to as "client remote presentation session communications," and these communications sent from VM-N 310n to consolidated role 424 may be referred to as "server remote presentation session communications."

Communications 646 between consolidated role 424 and VM-N 310n may be effectuated in a variety of ways. For instance, communication 646 may be effectuated by establishing a TCP/IP (Transmission Control Protocol/Internet Protocol) connection between consolidated role 424 and VM-N 310n. The remote presentation session connection may then be constructed via this TCP/IP connection.

As another example, communication 646 may be effectuated through the use of shared resources between consolidated role 424 and VM-N 310n. For example, these shared resources may comprise a remote presentation session protocol stack that is split between consolidated role 424 and VM-N 310n—some functionality of the stack is implemented in consolidated role 424 and other functionality of the stack is implemented in VM-N 310n. Communications from consolidated role 424 to VM-N 310n may be effectuated by sending data "up" the stack, and communications from VM-N 310n to consolidated role 424 may be effectuated by sending data "down" the stack. A remote presentation session protocol stack that is split between consolidated role 424 and VM-N 310n is depicted with more detail in FIG. 7B.

Figure 7A:
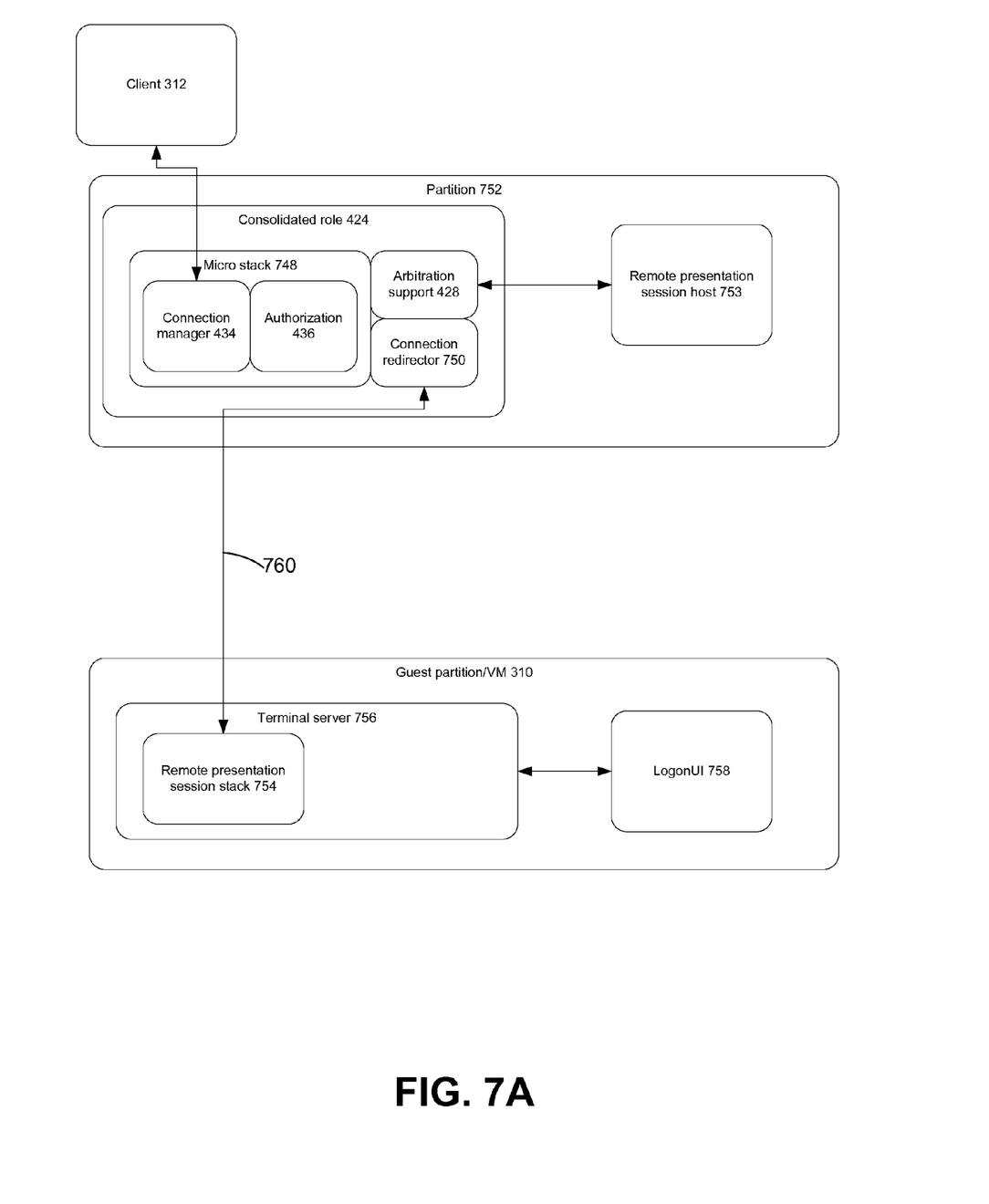
FIG. 7A depicts a remote presentation session communication between a consolidated role and a VM using a TCP/IP connection, in accordance with the remote presentation session server of FIG. 6.

FIG. 7A depicts a remote presentation session communication between a consolidated role and a VM using a TCP/IP connection, in accordance with the remote presentation session server of FIG. 6.

As depicted, consolidated role 424 comprises remote presentation session micro stack 748 (which, in turn, comprises connection management 434, and authorization 436), arbitration support 428, and connection redirector 750. Consolidated role 424 executes within partition 752, along with remote presentation session host 753 (which manages the VMs executing on server 536). Partition 752 may comprise a host partition or guest partition of server 536.

Guest VM 310 comprises remote presentation stack 754, terminal server 756, and LogonUI 758 (a logon user interface presented to a client when it attempts to log on to a session of VM 310).

For remote presentation session communications where consolidated role 424 communicates with RDP stack 754, this communication is done via TCP/IP connection 760.

When client 312 communicates with server 536 to establish a remote presentation session, this communication is received at connection management 434. After authentication of client 312 by authentication 436, connection redirector 750 establishes a remote presentation session with remote presentation stack 754. Connection redirector 750 establishes this session via TCP/IP communication 760. Connection redirector 750 interacts with remote presentation stack 754 in the same manner that client 312 would, such that, from the point of view of remote presentation stack 754, it "thinks" that it is interacting with a client.

TCP/IP connection 760 may be secured, such as by Kerberos network authentication protocol, or by an authentication mechanism that is part of remote presentation stack 754 that serves a function with respect to partition 752 similar to the function that authentication 436 serves with respect to client 312.

After this remote presentation session is established between partition 752 and guest VM 310, connection management 434 communicates with client 312 to tell client 312 that a remote presentation session has been established between partition 752 and client 312. This may include transmitting remote presentation session communications received from guest VM 310 to client 312. In this way, client 312 "thinks" it is interacting with a remote presentation session server directly, because consolidated role 434 interacts with client 312 in the same way a remote presentation session server would to carry out a remote presentation session.

When consolidated role 434 receives remote presentation session communications from client 312, it, via connection redirector 750, passes those communications to remote presentation stack 754, modifying them where necessary (such as to indicate that they originate from partition 752 rather than client 312, or to re-encode them according to a remote presentation session protocol). Likewise, when consolidated role 434 receives remote presentation session communications from VM 310, it passes those communications to client 312, modifying them where necessary (such as to indicate that they originate from partition 752, or to re-encode them according to a remote presentation session protocol). In this manner, consolidated role 434 serves as a proxy or router for a remote presentation session conducted between client 312 and VM 310.

Figure 7B:
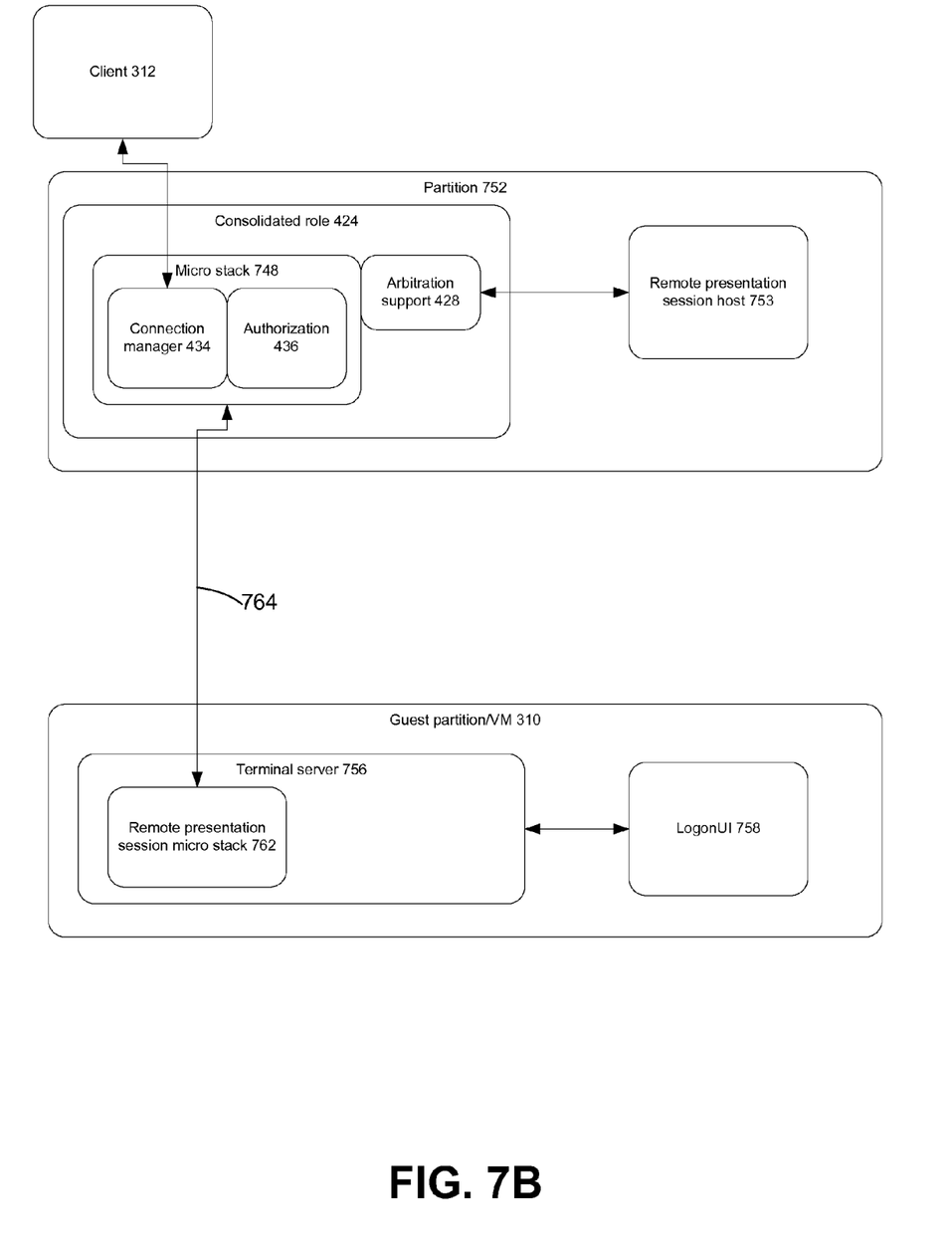
FIG. 7B depicts a remote presentation session communication between a consolidated role and a VM using a shared resource connection, in accordance with the remote presentation session server of FIG. 6.

FIG. 7B depicts a remote presentation session communication between a consolidated role and a VM using a shared resource connection, in accordance with the remote presentation session server of FIG. 6. A remote presentation session stack may be split into a role part (herein depicted by consolidated role 424), and a VM part (herein depicted by remote presentation micro split stack 762).

Here, the shared resource 764 comprises a shared memory area or shared buffer, such as HYPER-V™. Remote presentation micro split stack 762 may differ from remote presentation stack 754 of FIG. 7A in that it lacks some of the features of remote presentation stack 754. As depicted, remote presentation split stack lacks a TCP listener, authorization 436 and the ability to encrypt data, features which are commonly found within a remote presentation stack such as remote presentation stack 754.

It may be appreciated that while remote presentation micro split stack 762 is herein depicted as being split at the authorization level (in that authorization 436 is found within remote presentation micro stack 748, but not remote presentation micro split stack 762), the stack may be split at different levels within a remote presentation stack structure. For instance, the split could be pushed "higher" into the stack, such as at the encryption or remote presentation session encoding levels. The particulars of a system in which these teachings are implemented may determine the benefits of splitting the stack at various points.

The connection set up and remote presentation session operate here much as described with respect to FIG. 7A. When partition 752 has a communication to send to VM 310, remote presentation micro stack 748 places that communication in shared resource 760, where it can be obtained by VM 310. Likewise, when VM 310 has a communication to send to partition 752, remote presentation micro split stack 762 places that communication in shared resource 760, where it can be obtained by VM 310.

There are scenarios where a TCP/IP connection between consolidated role 424 and VM-N 310, as depicted in FIG. 7A may be beneficial, such as where VM-N is a legacy VM, and it is undesirable to modify it. There are also scenarios where the split-stack implementation depicted in FIG. 7B may be preferable, such as where this implementation may be effected so that it uses fewer processing resources to send data between consolidated role 424 and VM-N 310. Both of these types of connections—TCP/IP and split stack—may be used within a deployment. That is, consolidated role 424 may communicate with one or more VMs 310 via a TCP/IP connection, and one or more other VMs 310 via a split stack.

Figure 8:
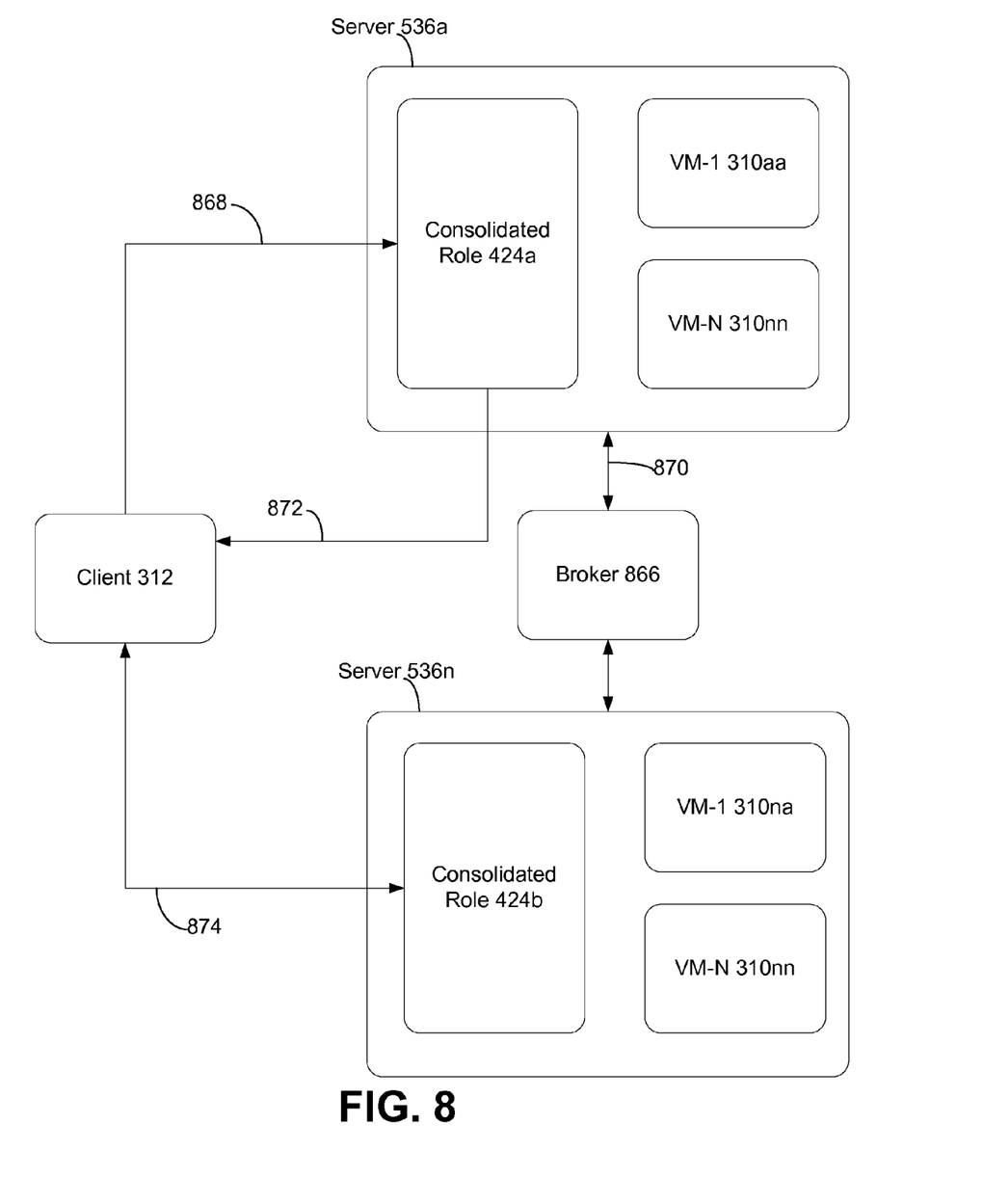
FIG. 8 depicts an example remote presentation session connection set up between a client and a plurality of servers that each comprise a consolidated role.

FIG. 8 depicts an example remote presentation session connection set up between a client and a plurality of servers that each comprise a consolidated role. A remote presentation session deployment comprises a plurality of servers 536 and broker 866. A deployment may comprise multiple servers, for instance, where the deployment is to serve a greater number of remote presentation sessions than a single server has processing resources to handle.

Two servers are depicted in the present figure—server 536a and server 536b. Each server is depicted as comprising a consolidated role (424a and 424b, respectively) and N virtual machines (310aa through 310nn, and 310na through 310nn; note that while each server is depicted as hosting N virtual machines, the number of virtual machines hosted by each server may differ from that of other servers of the deployment).

Client 312 communicates 868 with a server of the deployment (depicted here as communicating with server 536a) to establish a remote presentation session. These initial communications from clients may be spread amongst the servers of a deployment such as through utilizing a round-robin feature of DNS (the Domain Name System). Clients may connect using a fully-qualified domain name (FQDN) for the deployment (for instance, remotepresentationsession.com; NOTE: this is not a registered domain name as of the time of filing. Any subject matter that is made available at this fully-qualified domain name in the future is not necessarily related to the present disclosure). Through DNS, this hostname is translated into an IP address (i.e. four numbers ranging from 0-255, inclusive, in the form X.X.X.X, where a IPv4 address is used) and provided to the requester. The requester then connects to the computer that has this IP address.

By associating in DNS the hostname of the deployment and the IP address of each server of the deployment that is to handle connection set up communications from clients, DNS provides clients with one of the plurality of IP addresses, and may provide different clients with different IP addresses, so the initial communications are spread amongst these servers.

As depicted here, client 312 initially communicates with consolidated role 424a of server 536a for a remote presentation session connection set up. Consolidated role 424a may determine if a VM hosted on server 536a is to conduct the remote presentation session with client 312. It may determine this, for instance, by using similar techniques as described above with respect to FIG. 5.

Where consolidated role 424a determines that no VM on server 536a is to conduct the remote presentation session (for instance, where (1) no VM on server 536a has processing resources available or is in a state to accept a new remote presentation session connection; or (2) where there is such a VM on server 536a but for other reasons, such as load-balancing between servers (based on available load of the servers), the remote presentation session will be conducted by a VM of a different server), consolidated role 424a communicates a query 870 to broker 866 to determine a VM on a different server that is to conduct the remote presentation session with client 312. Broker 866 communicates with a plurality of servers of the deployment, to determine from those servers whether and to what degree they, and the VMs that execute upon them, are able to serve remote presentation sessions.

Consolidated role 424a receives from broker 866 a communication 870 on which other server client 312 is to connect to (as depicted here, that other server is server 536b). Consolidated role 424a communicates 872 this to client 312. Client 312 uses this information to communicate 874 with consolidated role 424b of server 536b. In communicating, client 312 and consolidated role 424b may use the techniques described in FIG. 5 or 6 to establish a remote presentations session connection between client 312 and a VM of server 536b.

FIG. 8 depicts a scenario where client 312 initially communicates with a first server, but ultimately conducts a remote presentation session with a VM hosted on a second server. It may be appreciated that, in a multi-server deployment, a scenario where the client initially connects to the same server hosts the VM with which the client conducts the remote presentation session may function similar as to the single-server scenarios depicted in FIGS. 5 and 6.

That is, the communications of 870, 872 and 874 need not occur. Consolidated role 424a may determine based on information contained within server 536a that a VM of server 536a will serve the remote presentation session. Upon making this determination, the remote presentation session hosted by server 536a may be established using techniques described with regard to FIG. 5 or 6.

CONCLUSION

While the present disclosure has been described in connection with the preferred aspects, as illustrated in the various figures, it is understood that other similar aspects may be used or modifications and additions may be made to the described aspects for performing the same function of the present disclosure without deviating therefrom. Therefore, the present disclosure should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method, comprising:
receiving, at a server, a remote presentation session connection request from a client based on an internet protocol address of the server determined by a round-robin feature of a domain name service, the server hosting a consolidated role, and a plurality of virtual machines (VMs), wherein the server is a physical server, wherein the consolidated role is an aggregation of a plurality of independent, computer-executable role functions for a plurality of computing devices in a network,
wherein the server executing the consolidated role determines a VM of the plurality of VMs, wherein the determination is based at least in part on information from the aggregated plurality of independent, computer-executable role functions and information indicative of a capability of the VM to conduct the remote presentation session with the client;
selecting, by the server executing the consolidated role, the VM of the plurality of VMs based at least in part on the determination;
establishing, by the server executing the consolidated role, a connection with the selected VM;
receiving, at the server executing the consolidated role, client remote presentation session communications from the client, the client remote presentation session communications being destined for the selected VM;
transmitting, from the server executing the consolidated role, the client remote presentation session communications to the selected VM through the connection;
receiving, at the server executing the consolidated role, server remote presentation session communications from the selected VM through the connection, the server remote presentation session communications being destined for the client; and
transmitting, from the server executing the consolidated role, the server remote presentation session communications to the client.

2. The method of claim 1, wherein establishing the connection with the selected VM comprises:
establishing, by the server executing the consolidated role, a Transmission Control Protocol/Internet Protocol (TCP/IP) connection with the selected VM.

3. The method of claim 2, wherein establishing the TCP/IP connection with the selected VM comprises:
constructing, by the server executing the consolidated role, a remote presentation session connection with the selected VM via the TCP/IP connection.

4. The method of claim 1, wherein establishing the connection with the selected VM comprises:
establishing, by the server executing the consolidated role, a shared resource connection with the selected VM.

5. The method of claim 4, wherein the shared resource connection comprises a split remote presentation session split stack, the remote presentation session split stack comprising a role part and a VM part, the role part executing in the consolidated role and the VM part executing in the VM.

6. The method of claim 5, wherein the role part and the VM part communicate via a shared memory area.

7. The method of claim 5, wherein the role part authenticates the client, and transmitting the client remote presentation session communications to the selected VM through the connection comprises:
storing the client remote presentation session communications in the shared resource, such that the VM part receives the client remote presentation session communications, and the VM part processes the client remote presentation session communications without authenticating the client.

8. The method of claim 1, wherein establishing, by the server executing the consolidated role, a connection with the selected VM comprises:
establishing a Transmission Control Protocol/Internet Protocol (TCP/IP) connection with the selected VM in response to determining that a shared resource connection with the selected VM cannot be established.

9. The method of claim 1, wherein selecting, by the server executing the consolidated role hosted by the server, the VM comprises:
selecting the VM based on load-balancing among the plurality of VMs.

10. The method of claim 1, wherein selecting, by the server executing the consolidated role hosted by the server, the VM comprises:
selecting the VM based on the VM having available load to conduct a remote presentation session with the client.

11. A remote presentation system, comprising:
a computing device comprising a memory, the memory bearing computer-executable instructions that, when executed by the computing device, cause the computing device at least to:
receive, by a consolidated role executing within a partition of the computing device, a remote presentation session connection request from a client based on an internet protocol address of the computing device determined by a round-robin feature of a domain name service, wherein the consolidated role is an aggregation of a plurality of independent, computer-executable role functions for a plurality of computing devices in a network, and wherein the computing device hosting a plurality of virtual machines (VMs).
wherein the computing device executing consolidated role determines a VM of the plurality of VMs, wherein the determination is based at least in part on information from the aggregated plurality of independent, computer-executable role functions and information indictive of a capability of the VM to conduct the remote presentation session with the client;
select, by the computing device executing the consolidated role, the VM of the plurality of VMs hosted by the computing device based on the determination;
establish, by the computing device executing the consolidated role, a connection with the selected VM;
receive, at the computing device executing the consolidated role, client remote presentation session communications from the client, the client remote presentation session communications being destined for the selected VM;
transmit, from the computing device executing the consolidated role, the client remote presentation session communications to the selected VM through the connection;
receive, at the computing device executing the consolidated role, server remote presentation session communications from the selected VM through the connection, the server remote presentation session communications being destined for the client; and
transmit, from the computing device executing the consolidated role, the server remote presentation session communications to the client.

12. The system of claim 11, wherein select, by the computing device executing the consolidated role, a VM further comprises:
select the VM based on information stored in a data store on the computing device, the information comprising information on a capability of the VM to conduct a remote presentation session with the client.

13. The system of claim 11, wherein receive, by the consolidated role executing within a partition of the computing device, a remote presentation session connection request from a client further comprises:
determine, by the computing device executing the consolidated role, that the client is authorized to conduct a remote presentation session with the VM.

14. The system of claim 11, wherein receiving, by a consolidated role executing within a partition of the computing device, a remote presentation session connection request from a client further comprises:
determine, by the computing device executing the consolidated role, a license for the client with which to conduct a remote presentation session with the VM; and
send, by the computing device executing the consolidated role, the license to the client.

15. A computer-readable storage device, bearing computer-readable instructions, that when executed on a server of a remote presentation session deployment, cause the computer to perform operations comprising:
receiving, by a consolidated role executing within a partition of the server, a remote presentation session connection request from a client, the remote presentation session request being received without the remote presentation session request being processed by a connection broker of the remote presentation session deployment, wherein the consolidated role is an aggregation of a plurality of independent, computer-executable role functions for a plurality of computing devices in a network;
determining, by the consolidated role executing within the partition of the server based at least in part on information from the aggregated plurality of independent, computer-executable role functions, that no virtual machine (VM) of a plurality of VMs hosted by the server is available to serve the remote presentation session with the client;
querying, by the consolidated role executing within the partition of the server, a broker connected to a second server to determine a VM that is hosted by the second server and that is available to serve the remote presentation session with the client;
receiving, by the consolidated role executing within the partition of the server, an identity of the second server, based on the query; and
sending, from the consolidated role executing within the partition of the server to the client, an indication to conduct the remote presentation session with the second server such that the client contacts the second server and establishes a remote presentation session with the VM hosted by the second server.

16. The computer-readable storage device of claim 15, wherein the deployment comprises a plurality of servers, and the broker is configured to communicate with each server of the plurality of servers to determine whether a server may conduct a remote presentation session.

17. The computer-readable storage device of claim 15, wherein the broker maintains a database comprising an indication that the second server has capability to host the remote presentation session with the client; and in response to querying, by the consolidated role executing within the partition of the server, the broker for the second server, the broker determines that the second server hosts a VM that will serve the remote presentation session based on the database.

18. The computer-readable storage device of claim 15, wherein in response to querying, by the consolidated role executing within the partition of the server, the broker for the second server, the broker determines that the second server hosts a VM that will serve the remote presentation by querying the second server to determine that the second server is capable of serving the remote presentation session.

19. The computer-readable storage device of claim 15, wherein the server and the second server have the same fully-qualified domain name (FQDN); and receiving, by a consolidated role executing within a partition of the server, a remote presentation session connection request from a client occurs as a result of the client querying a domain name system (DNS) for an Internet Protocol (IP) address of the deployment, and receiving in response an IP address of the server based on a round-robin feature of the DNS.

20. The computer-readable storage device of claim 15, wherein sending the client an indication to conduct the remote presentation session with the second server, such that the client contacts the second server and establishes a remote presentation session with the VM hosted by the second server, comprises:

sending the client an indication to conduct the remote presentation session with the second server, such that:

the client contacts a second consolidated role executing within a partition of the second server;

the second consolidated role executing within the partition of the second server selects the VM of a plurality of VMs hosted by the second server; and the client conducts the remote presentation session with the selected VM.

\* \* \* \* \*